United States Patent [19]

Samuel et al.

[11] 4,238,332

[45] Dec. 9, 1980

[54] DECANTATION METHODS

[75] Inventors: Yves Samuel; Philippe Gillet, both of St. Avold, France

[73] Assignee: Societe Chimique des Charbonnages, France

[21] Appl. No.: 961,908

[22] Filed: Nov. 20, 1978

Related U.S. Application Data

[63] Continuation-in-part of Ser. No. 835,082, Sep. 20, 1977, abandoned.

[30] Foreign Application Priority Data

Sep. 23, 1976 [FR] France .................................. 76 28680

[51] Int. Cl.$^3$ ............................................. B01D 17/00
[52] U.S. Cl. .................................................... 210/774
[58] Field of Search .................... 210/71, 72, 176, 187

[56] References Cited

U.S. PATENT DOCUMENTS

| | | | |
|---|---|---|---|
| 1,940,753 | 12/1933 | Howard | 210/72 |
| 2,081,215 | 5/1937 | Boosey | 210/187 |
| 2,315,762 | 4/1943 | Ax et al. | 210/72 X |
| 2,337,317 | 12/1943 | Eggert | 210/72 X |
| 2,358,414 | 9/1944 | Peavey | 210/72 |
| 2,834,464 | 5/1958 | Fellows et al. | 210/72 |
| 3,272,339 | 9/1966 | Olson | 210/187 X |
| 3,674,884 | 7/1972 | Moritani et al. | 260/671 A X |
| 4,048,063 | 9/1977 | Cheng | 210/72 |

Primary Examiner—William A. Cuchlinski, Jr.
Attorney, Agent, or Firm—Karl W. Flocks

[57] ABSTRACT

An improved method of decantation in a decanter for separating solid particles suspended in a liquid consists of creating a single thermal barrier located solely in the liquid phase least charged with product to be separated. In the case of a continuous decantation method the thermal barrier is formed between the inlet zone for the mixture to be decanted and the outflow zone for the decanted liquid.

7 Claims, 1 Drawing Figure

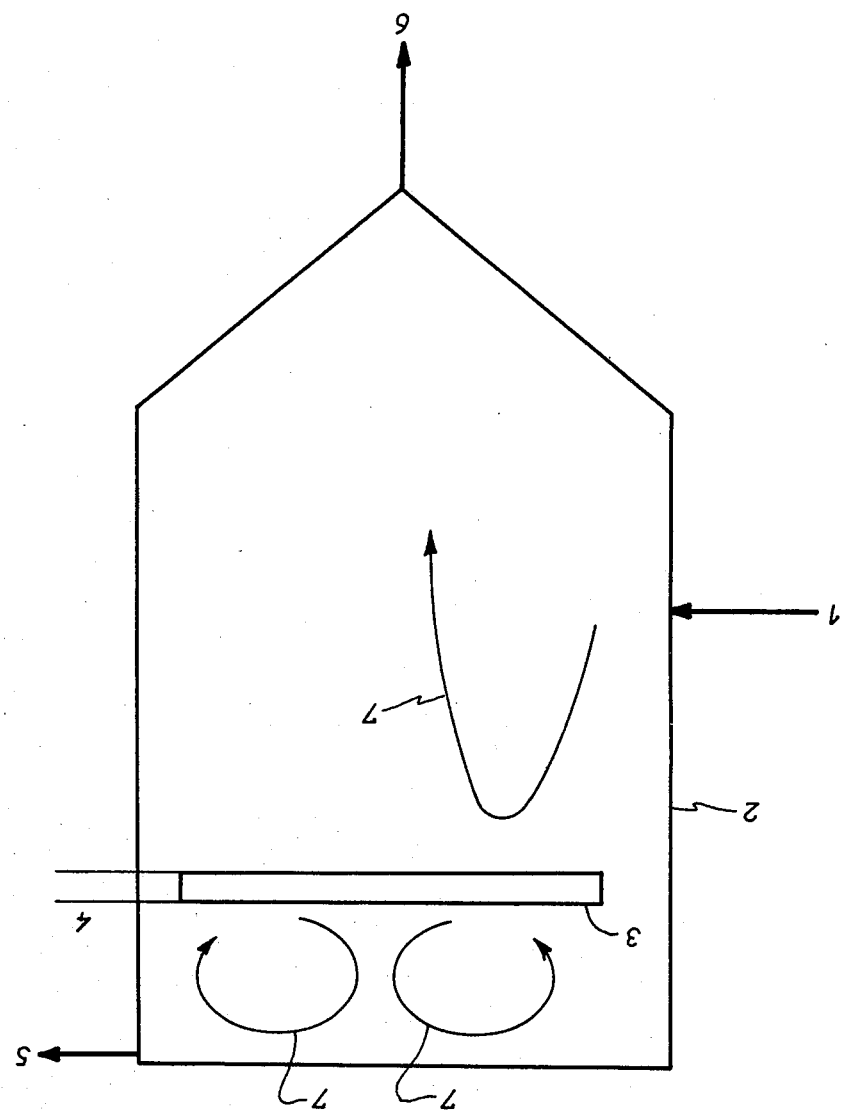

DECANTATION METHODS

This application is a continuation-in-part of application Ser. No. 835,082, filed Sept. 20, 1977 now abandoned by the present inventors.

BACKGROUND OF THE INVENTION

1. Field of the Invention

The present invention relates to an improvement in decantation methods.

2. Description of the Prior Art

When a mixture whose temperature is different from ambient temperature is subjected to decantation, convection currents occur in the decanter which are detrimental to good separation of the mixture. If, for example, a hot liquid containing a suspended solid is introduced into a decanter, the temperature of the products standing in the decanter will, due to thermal losses, be slightly lower than the temperature of products arriving in the apparatus. The latter will hence have a tendency to rise and as a result thereof, in the whole of the decanter, convection currents will occur which will be detrimental to the sound operation of the apparatus.

It is an object of the present invention to provide a method which will neutralize the effect of the detrimental convection currents and consequently to provide a method which enables the efficiency of the decanters used to be notably improved.

GENERAL DESCRIPTION OF THE INVENTION

The method according to the invention is characterized by the fact that it consists of creating a single thermal barrier solely in the phase which is least charged with the product to be separated.

In the particular case of a continuously operating decanter, said single thermal barrier is arranged between the zone of introduction of the product to be decanted and the outflow zone of the decanted liquid.

By thermal barrier is meant means for heating or cooling the mixture present in the decanter. The thermal barrier is advantageously constituted by a heat exchanger. It may also consist of an electrical heating resistor.

By proceeding in this way, a fuller separation is obtained more easily which permits subsequent operations such as a further decantation, filtration or centrifugation to be dispensed with or facilitates such operations as a result of the decrease in the amount of product remaining to be separated.

If a mixture which is at a temperature higher than ambient temperature is subjected to decantation, and if the particles to be decantated are denser than the liquid medium, the thermal barrier is constituted by heating means placed in the upper portion of the decanter (above the feed zone in the case of a continuously operating decanter). If the particles to be decanted are less dense than the liquid medium, the thermal barrier is constituted by cooling means positioned in the lower portion of the decanter (below the feed zone in the case of a continuously operating decanter).

In the same way, if a mixture which is at a temperature below ambient temperature is subjected to decantation and if the particles to be separated are less dense than the liquid medium, the thermal barrier is constituted by cooling means placed in the lower portion of the decanter. On the other hand, if the particles to be separated are denser than the liquid medium, the thermal barrier is constituted by heating means placed in the upper zone of the decanter.

In each case, the single thermal barrier used is located so as to be solely in the liquid phase least charged with the particles to be separated.

The temperature difference between the wall of the heating or cooling means and the mixture present in the decanter must be sufficiently small not to create convection movements which are too rapid and would disturb the decantation. It is advantageously comprised between 5° and 35° C.

According to the invention, the heating or cooling means is adjusted so that the temperature difference between the top and the bottom of the decanter is maintained preferably between 1° and 5° C.

DESCRIPTION OF A PREFERRED EMBODIMENT

The invention will be better understood by means of the following example given by way of illustration and which is not to be considered as in any way limiting, in the case of a continuous decanter, shown diagrammatically in the accompanying drawing.

The decanter taken here as an example is applied for the separation of the mixture of salts and of alkylate coming from an installation for the manufacture of ethylbenzene by the reaction of ethylene with benzene in the presence of aluminum chloride, after treatment of the product emerging from the alkylation reactor with ammonia according to the processes described in U.S. Pat. application Ser. No. 741,488 filed on Nov. 12, 1976 [now U.S. Pat. No. 4,117,023 granted Sept. 26, 1978] by Philippe Jean Gillet and Gaston Henrich with the same assignee as with this application. The product to be decanted is present in the form of a liquid containing in suspension about 2% of a heavier flocculent product composed of salts impregnated with hydrocarbons.

This product, at a temperature of 55° C., is introduced at inlet 1 into the decanter 2. This decanter includes in the upper zone a heat exchanger 3 supplied at 4 with hot water at 80° C. The decanted liquid is collected at 5 whilst the product concentrated in solid particles is withdrawn at 6.

The water flow rate in the exchanger is adjusted so that the temperature difference between the top and the bottom of the decanter is comprised between 1° and 2° C. Convection movements are then established in the decanter as shown at 7.

Under these conditions the liquid collected at 5 is absolutely clear and the content of solid particles therein is indeterminable. It is hence unnecessary to filter it.

If the hot water inflow at 4 is arrested, the content of solid particles of the liquid collected at 5 increases to reach at equilibrium a value higher than 50 ppm. It is self-evident that the present invention has only been described purely by way of illustration and in a manner which is not to be considered as in any way limiting and that any useful modifications could be introduced therein without departing from its scope as defined by the appended claims.

We claim:

1. A method of continuous decantation and neutralizing convection currents between material feed and material about to be or being decanted, comprising the steps of continuously introducing the mixture to be decanted at a feed temperature in association with an introductory zone of the mixture in the vicinity of the inlet of the decanter, removing decanted liquid from the decanter at an outflow zone at an outflow temperature, and creating a single thermal barrier by means located solely within the liquid phase least charged with the product to be separated from the mixture and between the introductory zone and the outflow zone, thereby avoiding convection streams by compensating the difference of temperature between the liquid mixture entering the decanter and the liquid already in the decanter.

2. A method of decantation according to claim 1, wherein said means creating a thermal barrier is a heating means.

3. A method of decantation according to claim 1, wherein said means creating a thermal barrier is a cooling means.

4. A method of decantation according to claim 1, wherein said means creating a thermal barrier is a heat exchanger.

5. A method of decantation according to claim 1, wherein the temperature difference between the wall of the means creating a thermal barrier and the mixture to be decanted is in the range of between 5° and 35° C.

6. A method of decantation according to claim 1, wherein the means creating a thermal barrier maintains between the top and the bottom of the decanter, a temperature difference comprised between 1° and 5° C.

7. A method of decantation according to claim 1, wherein the mixture to be separated is that of the catalyst coming from an installation for the alkylation of benzene with ethylene.

* * * * *